INVENTORS
HARRY P. LYNN &
HENRY J. TISCHLER
BY
Barnes, Kisselle, Raisch & Choate
ATTORNEYS INVENTORS
HARRY P. LYNN &
HENRY J. TISCHLER
BY
Barnes, Kisselle, Raisch & Choate

ATTORNEYS

United States Patent Office 3,398,987
Patented Aug. 27, 1968

3,398,987
FOLDING AUTOMOBILE SEAT
Harry P. Lynn, Detroit, and Henry J. Tischler, Bloomfield Hills, Mich., assignors to Young Spring & Wire Corporation, Detroit, Mich., a corporation of Delaware
Filed Dec. 1, 1966, Ser. No. 598,334
13 Claims. (Cl. 297—379)

ABSTRACT OF THE DISCLOSURE

The folding automobile seat disclosed herein comprises a seat back and a seat base. A pair of vertically spaced studs are mounted on the seat base and a bracket is mounted on the seat back. The bracket has a pair of slots into which the studs extend to guide the folding action of the seat. A latch is provided on the seat back and engages one of the studs to lock the seat back in upright position.

---

This invention relates to a folding automobile seat and particularly to a folding automobile seat which is locked in upright position.

In two-door automobiles, it is conventional to have the seat back of the front seat foldable forwardly to permit ingress to and egress from the rear seat. The foldable seat back provides a source of injury in the event of accidents since there is a tendency of the seat back to fold forwardly upon collision. It is therefore desirable to have a lock for the seat back.

Among the objects of the invention are to provide a folding automobile seat that has a lock which will positively lock the seat back in upright position; which has a back that can be readily unlocked to permit ingress to or egress from the rear seat; which is relatively low in cost; and which can be readily unlocked.

Basically, the invention comprises a pair of vertically spaced studs mounted on the seat base and a bracket mounted on the seat back, the bracket having a pair of slots into which the studs extend to guide the folding action of the seat. A latch is provided on the seat back and engages one of the studs to lock the seat back in upright position.

Figure 1:
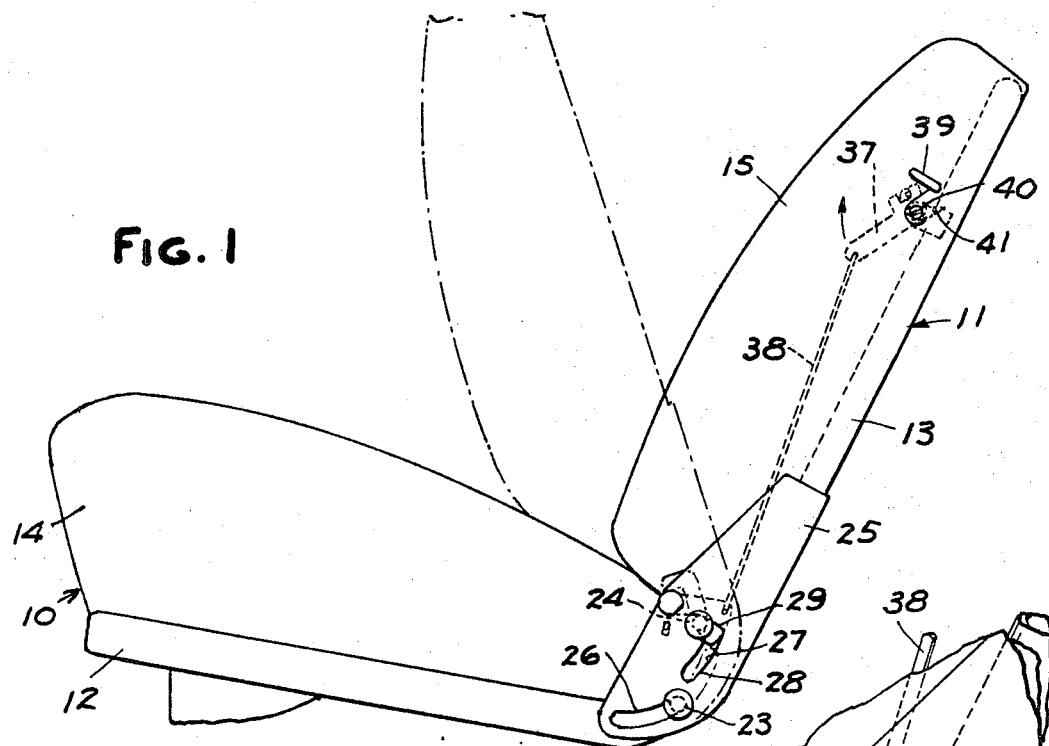
FIG. 1 is a side elevational view of a seat embodying the invention.
Figure 2:
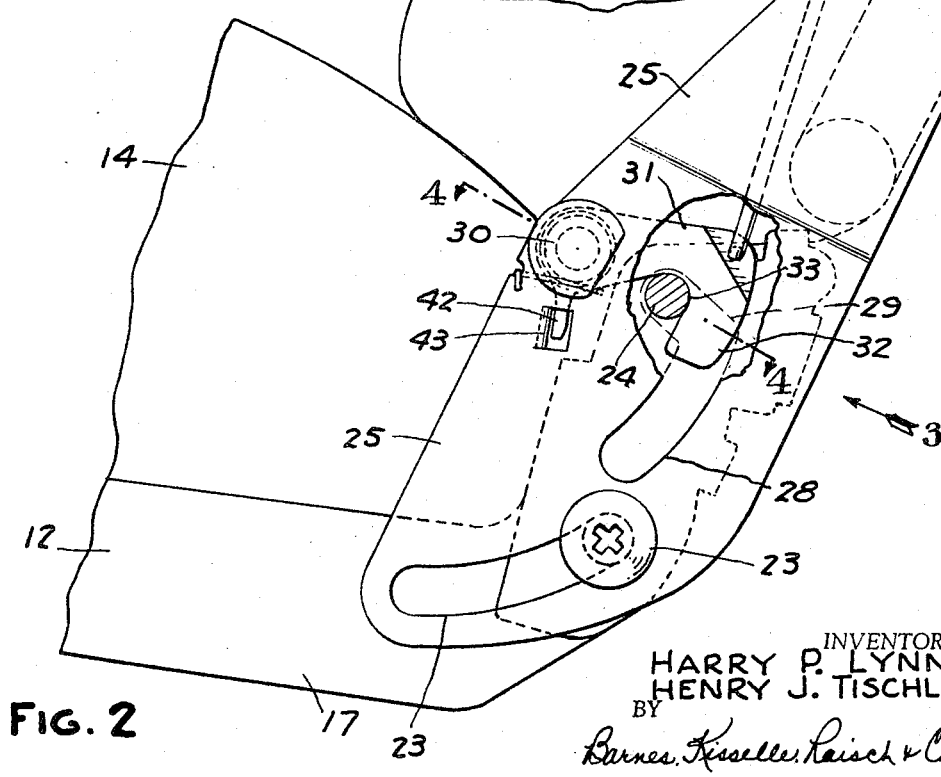
FIG. 2 is a part sectional side elevational view on an enlarged scale of a portion of the seat shown in FIG. 1.
Figure 3:
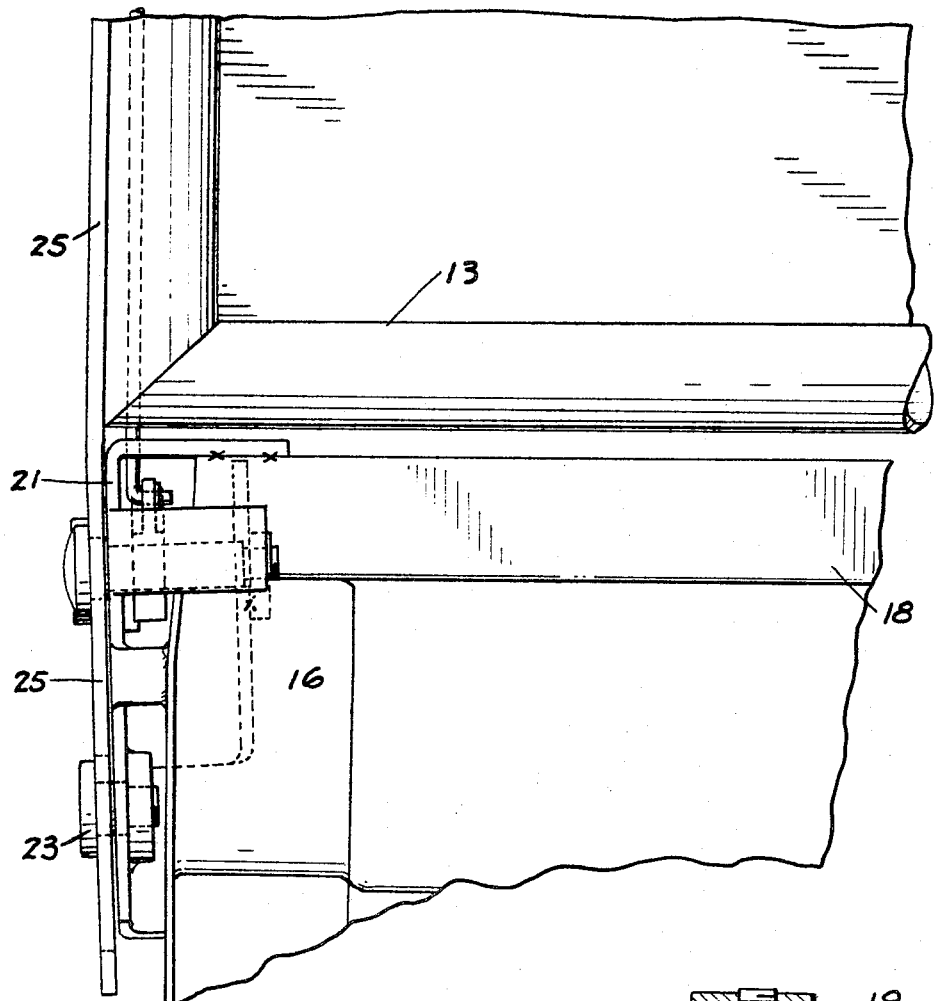
FIG. 3 is a fragmentary view taken in the direction of the arrow 3 in FIG. 2.

Referring to FIG. 1, the front seat embodying the invention is adapted to be mounted in an automobile and comprises a seat base 10 and a seat back 11, each of which has a frame 12, 13, respectively, on which spring and cushion structures 14, 15, respectively, are mounted in accordance with conventional construction.

The frame 12 of the seat base 12 includes at the outside corner a sheet metal portion 16 that interconnects the side rail 17 and rear rail 18. A U-shaped bracket 19 is welded to the portion 16 and has generally vertical walls 20, 21 interconnected by a generally vertical bight portion 22. A lower stud 23 is fixed on the wall 21 while an upper stud 24 extends between the wall 20, 21.

A bracket 25 in the form of a plate is fixed on the side of the seat back 11 and extends vertically downwardly adjacent the wall 21 of the bracket 19. Bracket 25 is formed with a lower slot 26 that extends downwardly and forwardly when the seat back 11 is in upright position. An upper slot 27 is in the form of an inverted L having a downwardly and forwardly extending leg 28 and a generally horizontal forwardly extending leg 29 when the bracket 25 and the seat back 11 is in upright position. The studs 23, 24 extend through the slots 26, 27 and guide the movement of the seat back as well as hold the seat back in upright position. When the seat back is in upright position, the stud 23 is at the rear end of the slot 26 and the stud 24 is at the forward end of the leg 29 of slot 27. As the seat back 11 is folded forwardly, the bracket 25 moves changing the relative positions of the studs 23, 24 so that the slot 26 moves in the manner that the stud approaches the forward end of the slot 26 while slot 27 moves guiding the seat back until the stud 24 is adjacent the lower end of the portion 28 of the slot 27.

Figure 4:
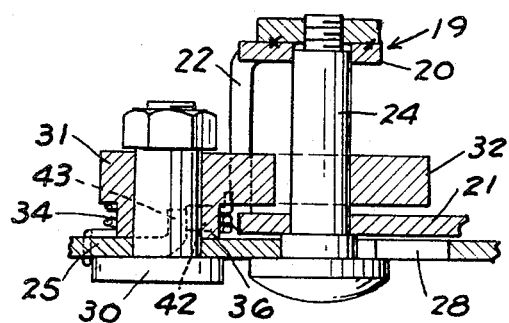
FIG. 4 is a fragmentary sectional view taken along the line 4—4 in FIG. 2.

Referring to FIG. 4, a pin 30 is fixed on the bracket 25 forwardly and at substantially the same level as the portion 29 of slot 27 and a latch 31 is pivoted on the pin 30. The latch 31 extends rearwardly and has a downwardly extending free end 32 which defines a notch 33 that engages the stud 24 when the seat back 11 is in upright position. A helical spring 34 has one end thereof engaging the bracket 25, is wound around a portion 36 of the latch 31 and has its other end bearing upon the latch 31 to yieldingly urge the latch 31 downwardly. Latch 31 includes an integral downwardly extending projection 42 that is adapted to engage a tab 43 struck inwardly from bracket 25. Tab 42 limits the clockwise movement of latch 31 under the action of spring 34 so that it may readily engage the pin 24.

In order to release the latch 31, an unlocking mechanism is provided and includes a lever 37 that is pivoted to the frame 13 of the seat back adjacent the upper end of the seat and beneath the upholstery and is connected to the latch by a wire link 38. An operating handle 39 is fixed on the shaft 40 which rotates with the lever 37 and extends exteriorly of the upholstery so that by manipulation of the handle 39, the lever 37 can be swung clockwise as viewed in FIG. 1 to lift the latch 31 and permit forward folding of the seat. In order to facilitate the movement, another helical spring 41 tends to urge the lever 37 in a counterclockwise direction as viewed in FIG. 1.

We claim:
1. In a folding seat, the combination comprising
    a base,
    a seat back,
    and means for pivotally supporting one end of said seat back to said base comprising
    a pair of studs mounted on said base in vertically and closed spaced relation to one another,
    a bracket on said seat back,
    said bracket having a first slot through which the uppermost stud extends and a downwardly facing guiding surface engaging the lowermost stud,
    said studs guiding the movement of said seat back from an upright position to a forward folded position,
    a latch pivoted to said bracket on said seat back and engaging one of said studs,
    and means yieldingly urging said latch in a direction to maintain said latch in engaged position with said stud.

2. The combination set forth in claim 1 including latch operating means mounted adjacent the upper portion of said seat back and means interconnecting said last mentioned means and said latch whereby said latch can be operated from a position adjacent the upper edge of said seat back.

3. In a folding seat, the combination comprising
    a base,
    a seat back, and means for pivotally supporting one end of said seat back to said base comprising a pair of studs mounted on said base in vertically and closed spaced relation to one another, a bracket on said seat back, said bracket having a first slot through which the uppermost stud extends and a downwardly facing guiding surface engaging the lowermost stud, said studs guiding the movement of said seat back from an upright position to a forward folded position, a latch pivoted to said bracket on said seat back and engaging one of said studs, and means yieldingly urging said latch in a direction to maintain said latch in engaged position with said stud, latch operating means mounted adjacent the upper portion of said seat back and means interconnecting said last mentioned means and said latch whereby said latch can be operated from a position adjacent the upper edge of said seat back, said latch operating means comprising a handle pivoted to said seat back and an arm fixed to said handle, said interconnecting means comprising link means between said lever and said latch, whereby when said handle is pivoted, said arm is moved.

4. The combination set forth in claim 3 wherein said latch has a free end thereof extending rearwardly and over the uppermost stud when the seat back is in upright position.

5. The combination set forth in claim 3 wherein said slot through which the uppermost stud extends has a first portion extending generally vertically when the seat back is in upright position and a second portion extending generally forwardly.

6. The combination set forth in claim 3 wherein said surface on said bracket which engages the lowermost stud forms a part of a slot that extends generally downwardly and forwardly when the seat back is in upright position.

7. In a folding seat the combination comprising a base, a seat back, and means for mounting one edge of said seat back on said base comprising a pair of vertically spaced studs on said base, a bracket on said seat back having vertically spaced slots therein through which said studs extend, the uppermost slot through which the uppermost stud extends having the general shape of an inverted L with a forwardly extending upper leg and a vertically and downwardly extending lower leg, the lowermost slot through which the lower stud extends extending downwardly and forwardly when the seat back is in upright position, the width of said slots being substantially equal to the diameter of said studs, whereby said slots and studs guide the movement of said seat back from an upright position to a forward folded position, a latch pivoted to said bracket and engaging said uppermost stud when the seat back is in upright position, means yieldingly urging said latch into engagement with said stud, and means for disengaging said latch from engagement with said stud.

8. The combination set forth in claim 7 including a pair of spaced walls on said base and supporting said uppermost stud.

9. The combination set forth in claim 7 wherein said latch extends rearwardly into overlying relation with said stud when the seat back is in upright position.

10. The combination set forth in claim 7 wherein said means for disengaging said latch comprises a lever pivoted to said seat back adjacent the upper end thereof, means interconnecting said lever and said latch, and means yieldingly urging said lever in a direction opposite to that for disengaging said latch.

11. The combination set forth in claim 7 wherein said latch extends rearwardly into overlying relation with said stud when the seat back is in upright position, said means for disengaging said latch comprises a lever pivoted to said back adjacent the upper end thereof, means interconnecting said lever and said latch, and means yieldingly urging said lever in a direction opposite to that for disengaging said latch.

12. The combination set forth in claim 7 including means for limiting the movement of said latch under the action of said yielding means.

13. The combination set forth in claim 12 wherein said last-mentioned means comprises a tab on said bracket, said latch including a projection adapted to engage said tab.

References Cited

UNITED STATES PATENTS

| | | | |
|---|---|---|---|
| 2,559,548 | 7/1951 | Seigneur | 297—379 XR |
| 2,972,374 | 2/1961 | McKey | 297—374 |
| 3,028,198 | 4/1962 | Murr | 297—216 |
| 3,079,199 | 2/1963 | Tischler | 297—367 |
| 3,328,077 | 6/1967 | Krasinski | 297—379 |
| 3,338,633 | 8/1967 | Jackson | 297—379 |

BOBBY R. GAY, *Primary Examiner.*

GLENN O. FINCH, *Assistant Examiner.*